March 27, 1973    J. H. HOUDRY    3,723,070
CATALYTIC OXIDATION APPARATUS
Filed Nov. 27, 1970    6 Sheets-Sheet 1

INVENTOR.
Jacques H. Houdry
BY Paul + Paul
ATTORNEYS.

Fig. 3

March 27, 1973  J. H. HOUDRY  3,723,070
CATALYTIC OXIDATION APPARATUS
Filed Nov. 27, 1970  6 Sheets-Sheet 3

INVENTOR.
Jacques H. Houdry

BY *Paul + Paul*
ATTORNEYS.

March 27, 1973   J. H. HOUDRY   3,723,070
CATALYTIC OXIDATION APPARATUS

Filed Nov. 27, 1970   6 Sheets-Sheet 6

INVENTOR.
Jacques H. Houdry
BY Paul + Paul
ATTORNEYS.

United States Patent Office 3,723,070
Patented Mar. 27, 1973

3,723,070
CATALYTIC OXIDATION APPARATUS
Jacques H. Houdry, Villanova, Pa., assignor to
Oxy-Catalyst, Inc., West Chester, Pa.
Filed Nov. 27, 1970, Ser. No. 93,042
Int. Cl. F01n 3/14
U.S. Cl. 23—288 F                             22 Claims

ABSTRACT OF THE DISCLOSURE

Internal combustion engine exhaust gases are catalytically oxidized by providing in the gas stream a catalytic hot resistance element of small mass and surface area and a downstream catalyst bed of large mass and surface area. The hot resistance element quickly reaches catalytically effective temperature, and its heat plus heat of catalytic oxidation coact to accelerate the heating of the large catalyst bed accelerating its heating and causing it quickly to reach its effective catalytic operating temperature.

BRIEF SUMMARY OF THE INVENTION

This invention relates to an apparatus for catalytically oxidizing unburned carbon compounds, and relates more particularly to the catalytic decomposition of unburned products in the gases resulting from combustion of fuels of internal combustion engines. More specifically, this invention has particular application to the removal of sources of pollution from the exhaust gases from internal combustion engines such as gasoline or diesel engines in trucks, automobiles and other vehicles.

PRIOR ART

Various catalysts have been in existence for many years, which have been found effective for promoting catalytic oxidation of unburned products such as carbon monoxide, low molecular weight hydrocarbons such as methane, ethane, propane and butane, and also other noxious products produced as a result of incomplete or inefficient combustion of gasoline, kerosene and diesel oil, for example. Among such catalysts are various precious and even non-precious metals such as platinum, palladium, etc. and manganese, copper, chromium, etc., and it has been known to incorporate such various metals into catalyst pellets, for example, which pellets are contained in a muffler-like structure through which the exhaust gases are conducted. Typical patents of such type were granted to Oxy-Catalyst, Inc. as assignee of Eugene J. Houdry, Nos. 2,889,288 and 2,921,033.

It is also well known to provide catalytic support structures, other than pellets, having surfaces which are impregnated with thin coatings of catalytically active metals. One such support is shown and described in the U.S. patent to Houdry No. 2,742,437, granted to Oxy-Catalyst, Inc. on Apr. 17, 1956. This patent discloses a shaped support which is rigid in nature and which is held in the chamber in such a way that the thin catalytic coating is not subjected to abrasion, as is sometimes the case with pellets which are free to move relative to one another. The shaped support is provided with a plurality of slots or holes which serve as a multiplicity of catalytically active passages for the exhaust gases as they flow through the catalyst chamber.

Catalysts for vehicular use may also be formed in other ways, such as spaced ceramic columns each having a "tear-drop" cross-section, as described in the U.S. patent to Houdry No. 2,699,989, for example. Monolithic ceramic structures should, of course, be supported in such a manner as to protect them from the shocks and vibrations that are frequently encountered in vehicular use.

Catalyst pellet beds or shaped catalyst supports can be provided with a very large effective surface area. When used in conjunction with products of combustion of substantially lead-free fuel they have a long life and are particularly effective in oxidizing carbon monoxide and unburned hydrocarbons. They do, however, have substantial mass in relation to effective surface area. Because of this, considerable difficulty has been encountered in the practical vehicular use of such catalysts. This is because they do not become effective until they have reached a high temperature, such as 500–700° F., for example, depending upon the particular nature of the exhaust fumes that are entering the catalyst chamber. In view of the large mass of the pellets or structures forming the catalyst support, a long time is required in order to heat the catalyst bed or support up to operating temperature. Accordingly, such a bed or support has been found impractical during the warm-up periods of automobiles or trucks; an excessive period of time is required to transfer the necessary sensible heat by convection from the heat generated by combustion of fuel in the cylinders of the engine, through the exhaust manifold and into the catalyst contained in its treatment chamber. The disadvantage of such an operation is emphasized when one considers that the normal gasoline or diesel engine runs at a very low efficiency when it is cold and has just been started, and that this is the very time at which the engine produces the maximum percentage of air pollutants in its exhaust stream.

The U.S. patent to Berger No. 3,503,716 discloses the idea of preheating the exhaust gases at the start of operation of the engine, coupled with the concept of sending the preheated gases into the catalytic converter for oxidizing the unburned components of the exhaust gases. This patent also discloses that, once the catalytic converter is up to its operating temperature, auto-oxidation maintains the reactor at a proper temperature from then until the engine stops. However, the operation of the Berger device requires the heating of a catalytic body which has substantial mass, and this heating is provided by a coil which is not itself catalytic. Thus, a considerable period of time is required for heat to flow from the heating element into the mass of the catalytic body itself and nothing is done from the point of view of catalytic conversion of unburned components in the exhaust gases until such time as heat can be caused to flow by convection. Such convection heating, coupled with the relatively large mass of the sintered catalytic body, cause very substantial time delay especially when the engine is subjected to a cold start.

The patent to Saufferer No. 3,440,817 discloses the combination of a preheating catalyst together with a large catalyst. The preheating catalyst is composed of a catalyst mass which is similar to that of the main catalyst body, but the preheating catalyst has a mass of only about one-fourth to one-fifth of the entire required catalytic mass while the main unit contains about three-quarters to four-fifths of the entire required catalytic mass. The small converter is mounted near the engine where it will receive hot engine gases which have not had much chance to cool, while the large converter can be more conveniently located at a point remote from the engine. However, the location of the preheating catalytic unit near the engine requires special steels and an automatically operating by-pass system. Further, the pre-unit requires a considerable time to heat up to its operating temperature, particularly when the engine is started cold.

OBJECTS OF THE INVENTION

It is accordingly an object of this invention to provide an exhaust gas treatment apparatus which is substantially immediately effective and operative after a cold engine start, and which remains effective and operative for long periods of time and after the engine has reached its normal operating temperature.

Another object of this invention is to provide a catalytic exhaust gas treatment apparatus which is substantially immediately operative and effective, regardless of wide variations of engine speed, either immediately after starting or during extended operation of the engine. In this connection, another object and advantage of this invention is to provide for immediate and effective reduction in the contents of carbon monoxide, lower molecular weight hydrocarbons, unburned carbon and other noxious substances from the exhaust stream of an internal combustion engine, even when the engine is allowed to idle for extended periods of time, either immediately after it has been started or at any time subsequent thereto.

BRIEF SUMMARY OF THE INVENTION

It has been discovered that all of the foregoing objects of this invention may be accomplished by providing a unique combination of catalytic treatment stages which cooperate synergistically in the exhaust gas stream. According to this invention, a hot resistance element catalyst having a relatively small mass and surface area is arranged in the exhaust gas stream, upstream with respect to a catalyst chamber containing a pellet type or monolithic support type or other support type catalyst having a relatively large mass and surface area, all hereinafter referred to as a "bulk catalyst" in the interest of brevity.

The hot resistance element is preferably a metallic resistance element which heats quickly upon electrical energization. While preferably in the form of a plurality of spaced wires, it may also be in any other desired form, such as rod, ribbon, sheet, fin, etc. For the sake of brevity, all such resistance elements are referred to hereinafter generically as a "hot wire" catalyst or as a "wire" catalyst.

The wire catalyst is connected to a source of heat or electricity in such a manner that, whenever the engine is started, the hot wire catalyst is immediately energized and is immediately heated well above the critical temperature needed for the catalyst to function effectively in the particular type of gas stream produced by the particular engine involved. The bulk catalyst which is located downstream of the hot wire catalyst, may contain particles of the pellet type or may contain catalyst that is supported on a support in any manner, and its total mass and total surface area are preferably very much larger than the mass and surface area of the hot wire catalyst.

As stated, because its mass is many times greater than the mass of the hot wire, it is much more difficult to bring up to operating temperature.

This invention has unique advantage since, immediately after a cold start, the hot wire catalyst reaches its effective catalytic operating temperature and cooperates synergistically by producing catalytically oxidative reactions of the unburned ingredients in the exhaust stream, thus utilizing the heat of catalytic reactions drastically to increase the temperature of the exhaust stream and, accordingly, drastically to increase the speed of heating of the bulk catalyst which is located within the bulk catalyst chamber.

A sensing device may be provided in the bulk catalyst chamber to determine when the bed has reached a catalytically effective operating temperature. Electric circuitry may be provided, for example, which is responsive to a thermocouple located in the bulk catalyst to disconnect the electrical supply from the hot wire catalyst as soon as the bulk catalyst bed has reached an effective temperature for catalytic oxidation of the noxious substances contained in the exhaust stream. The life of the hot wire catalyst is significantly extended by disconnecting it when its catalytic effect is not needed.

DESCRIPTION OF THE DRAWINGS

The objects and advantages of this invention, including the simplicity and economy of the same and the ease with which it may be adapted to engines and to engine installations of widely varying types, will become apparent further hereinafter and in the drawings in which.

DETAILED DESCRIPTION

Figure 1:
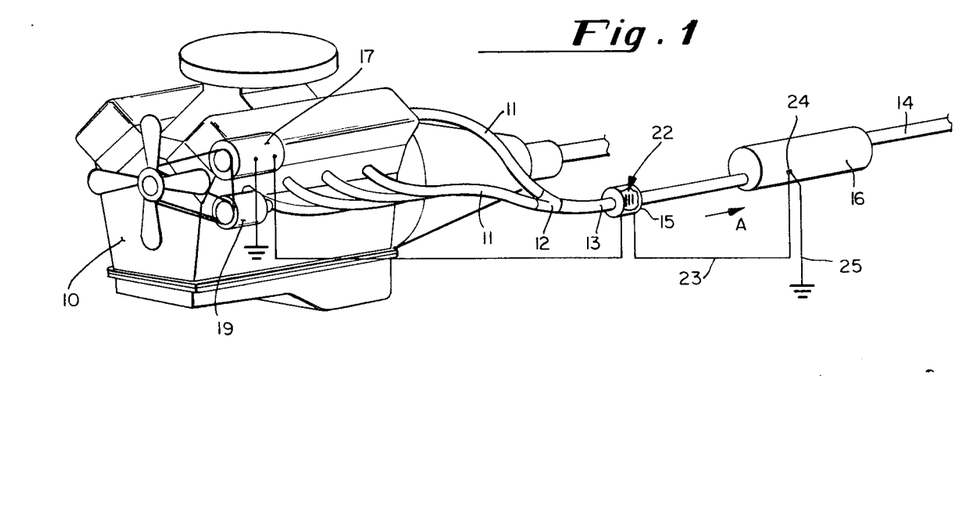
FIG. 1 is a schematic view in perspective, showing the engine and exhaust system of a motor vehicle, to which a typical form of apparatus in accordance with this invention has been applied.

FIG. 1 shows schematically a typical automobile engine 10 having exhaust manifolds 11, 11 joining at Y connector 12 with exhaust pipe 13. The exhaust gases resulting from internal combustion in the engine flow in the direction of the arrow (A) to and out of the outlet 14.

The number 15 designates a hot wire chamber mounted in the exhaust system and provided with an inlet opening and an outlet opening to accommodate flow of the exhaust gases through the chamber 15.

Also connected in the exhaust system is a bulk catalyst chamber 16, provided with an inlet opening and an outlet opening to accommodate flow of the exhaust gases through chamber 16.

The number 17 designates an alternator driven by belt 20 from the main or an auxiliary drive on the motor 10. The alternator 17 generates electricity in response to revolution of the engine and is normally connected to the battery so that the two provide a source of electrical power. A wire 21 extends from alternator 17 to and through the length of a hot wire 22 in chamber 15. A wire 23 extends from hot wire 22 through a thermocouple-actuated relay 24 in chamber 16 and a wire 25 extends from relay 24 to ground. Thus, means are provided for automatically energiizng hot wire 22 in response to starting of the engine 10.

The hot wire 22 is a special wire having a highly active catalytic surface which, when hot, effectively catalyses the oxidation reactions of noxious ingredients contained in the exhaust gases, particularly carbon monoxide and unburned hydrocarbons. Its particular nature and characteristics, as well as various ways of producing it, will be discussed in further detail hereinafter.

The bulk catalyst chamber 16 contains a substantial quantity of catalytic material, which may be in the form of pellets, monolithic structure or structures, or any other physical catalyst form in which the effective catalyst surface area is many times (for example, from 50 to 5,000 times) greater than the effective catalyst surface area of the hot wire in chamber 15, and its mass is also many times (for example, 25 to 5,000 times) greater than the hot wire catalyst mass.

A small air compressor 19 is desirably mounted on the engine 10 and driven from the main or an auxiliary drive on the motor 10, and has an outlet which is connected into the exhaust stream in a manner to inject secondary air into the exhaust emanating from the motor 10. In this manner the air compressor 19 assures the presence of excess air which supports the combustion of any unburned components in the exhaust gas under the influence of the catalytic components described herein.

Thus, in the operation of the apparatus of FIG. 1, when the engine 10 is started cold and operated or permitted to idle, current from alternator 17 (preferably supplemented or replaced by current from the battery) immediately heats hot wire 22 to a catalytically effective operating temperature, and hot wire 22 immediately oxidizes the carbon monoxide and unburned hydrocarbons contained in the stream. The catalytic oxidation reactions are exothermic and sharply increase the temperature of the exhaust gas stream, which then passes into and through the bulk catalyst chamber 16, heating the relatively large mass of catalyst contained therein. When the bulk catalyst mass reaches its operating temperature the thermocouple-actuated relay 24 opens the circuit and electrically de-energizes the hot wire in chamber 15, permitting it to continue to function as a catalyst or even to stop functioning as a catalyst, depending upon operating conditions. In either such event the temperature of the hot wire is lower when deenergized than when energized, and this prolongs the life of the catalyst on the hot wire.

Figure 2:
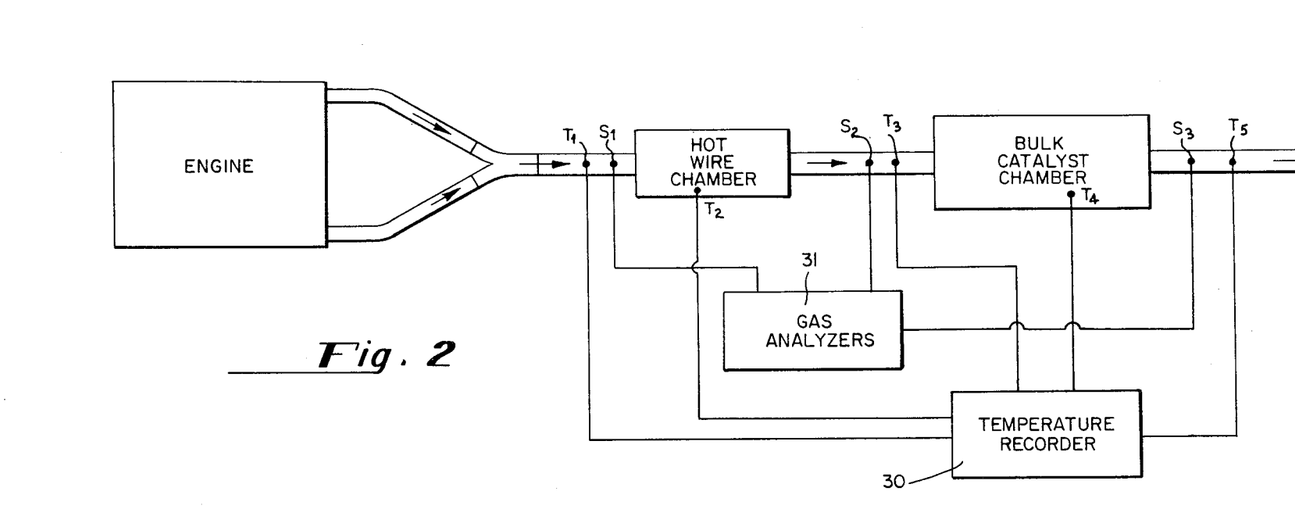
FIG. 2 is a schematic view showing the exhaust system of a typical motor vehicle arranged for testing in combination with continuously operative temperature measuring apparatus and gas analyzing equipment.

FIG. 2 shows diagrammatically a typical test installation for proving the effectiveness of the apparatus according to this invention in a particular installation. It will be observed that thermocouples $T_1$ through $T_5$ are located in the exhaust gas stream at the following locations.

$T_1$: upstream of hot wire chamber 15
$T_2$: within hot wire chamber 15
$T_3$: downstream of chamber 15 but upstream of bulk catalyst chamber 16
$T_4$: within bulk catalyst chamber 16
$T_5$: downstream of bulk catalyst chamber 16.

It will be observed, also, that gas sampling tubes are connected into the gas stream at the following locations:

$S_1$: upstream of hot wire chamber 15
$S_2$: downstream of chamber 15 but upstream of bulk catalyst chamber 16
$S_3$: downstream of chamber 16.

The temperature sensing devices $T_1$–$T_5$ are connected to a common temperature recorder 30 and the sample tubes $S_1$–$S_3$ are connected to common gas analysers 31, each of which periodically measures and records numerical values on a running chart.

Figure 3:
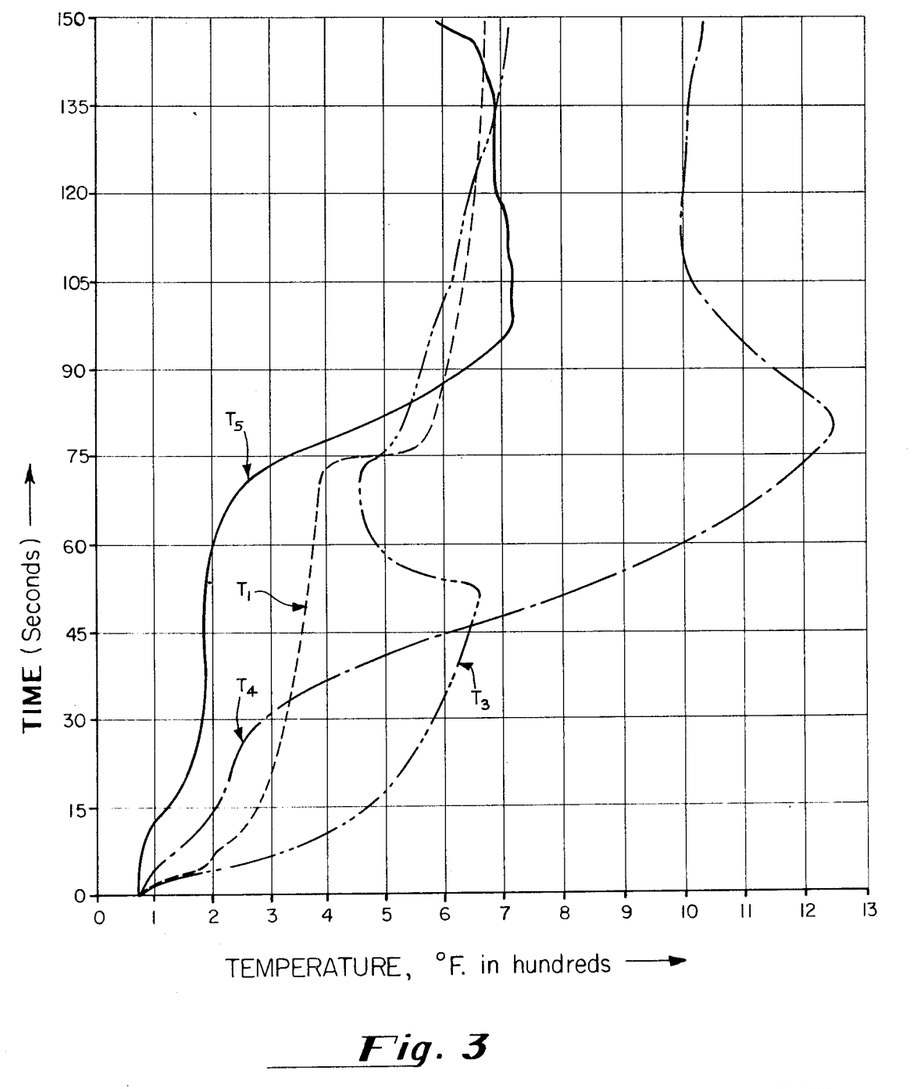
FIG. 3 is a graph showing typical operating results obtained in the testing apparatus of FIG. 2.

The diagram, FIG. 3, shows the temperature changes in a typical engine operation, in accordance with this invention, using a pellet catalyst bed and using two 2" hot wire coils arranged in series upstream and downstream of each other in the chamber 15. In the diagram, the ordinant indicates seconds of time while the abscissa indicates hundreds of degrees Fahrenheit. The curve $T_5$ indicates the temperature of the exhaust fumes at the outlet, after all catalytic treatment has been completed. The curve $T_1$ indicates the changes of temperature of the exhaust gases at the inlet to the hot wire catalyst. The curve $T_3$ represents the temperature at the outlet from the hot wire catalyst, and the curve $T_4$ represents the temperature in the pellet catalyst bed.

It will be observed that, when the engine was started and run at 600 r.p.m., the temperature at the exhaust outlet (curve $T_5$) increased very slowly, and that the temperature $T_4$ in the pellet catalyst bed and the temperature $T_1$ at the inlet to the hot wire catalyst also increased slowly. However, curve $T_3$ shows that the temperature of the exhaust gases after they left the hot wire catalyst chamber 15, increased very sharply and drastically so that a temperature of 500° F. was reached after approximately 15 seconds. During this initial 15 second period, the catalyst wire itself was so hot as to cause immediate catalytic reaction in the gas stream passing adjacent to the wire, thus creating a substantially complete removal of noxious substances virtually instantaneously with the cold start of the engine. It will be noted that, within about 40 seconds the temperature of the gases emanating from the hot wire catalyst was well over 600° F., a temperature so high that the hot wire catalyst was considered to be no longer needed, particularly in view of the fact that the heat produced from the hot wire treatment so accelerated the heating of the pellets in the catalyst bed ($T_4$) that the pellets themselves had become heated to a temperature in excess of 600° F. It will be noted that, after about 50 seconds, the electricity to the hot wire catalyst was cut off, causing the temperature curve $T_3$ to shift to the left, while the temperature $T_4$ in the pellet catalyst bed continued to rise steadily, indicating that its own catalytic operation was at that time self-supporting. After a minute and a half the speed of the engine was increased from 600 r.p.m. to 1300 r.p.m., with a resultant shifting of the curves as indicated in the diagram.

The exhaust gases emitted were so low in unburned hydrocarbons and carbon monoxide that the continuously operative testing devices indicated less than 1% combustibles throughout the test from beginning to end.

Figure 5:
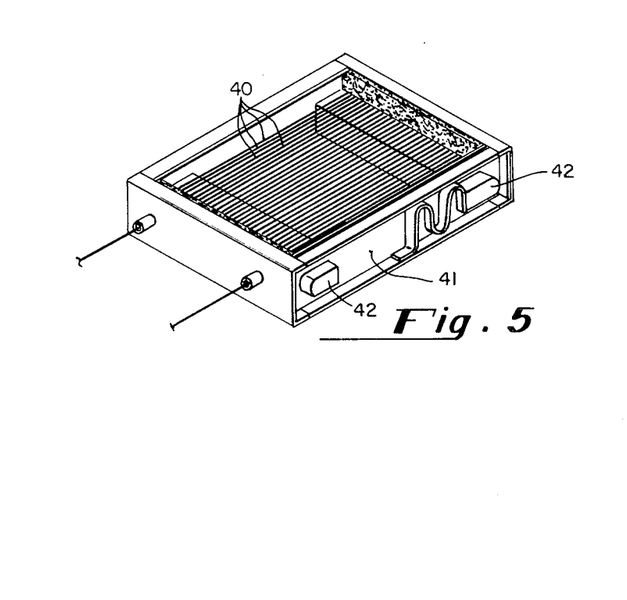
FIG. 5 is a view in perspective showing a typical coil which is especially useful in accordance with this invention.

One of the hot wire catalyst coils used in the run referred to above appears in FIG. 5 of the drawings. These coils are of the type shown in the patent to Houdry et al. No. 2,731,541. Each coil was composed of a plurality of Nichrome wires 40 each having a gamma-aluminum oxide surface tenaciously adhered to the surface thereof, and having minute, catalytically effective particles of platinum embedded in and deposited upon the gamma-aluminum oxide surface. If desired, these particles may be electrolytically deposited on the surface. The coil form shown in FIG. 5 in the aforementioned patent is particularly effective and useful in accordance with this invention inasmuch as it is rugged, compact, easy to install and to connect, and easy to replace in the event that replacement should be necessary. Furthermore, the provision of a multiplicity of fine wires 40 in the form of a coil carried in a frame 41 and wrapped around insulators 42, with each wire closely spaced from and substantially parallel to its neighbors, is a particularly effective and advantageous arrangement in accordance with this invention.

Figure 4:
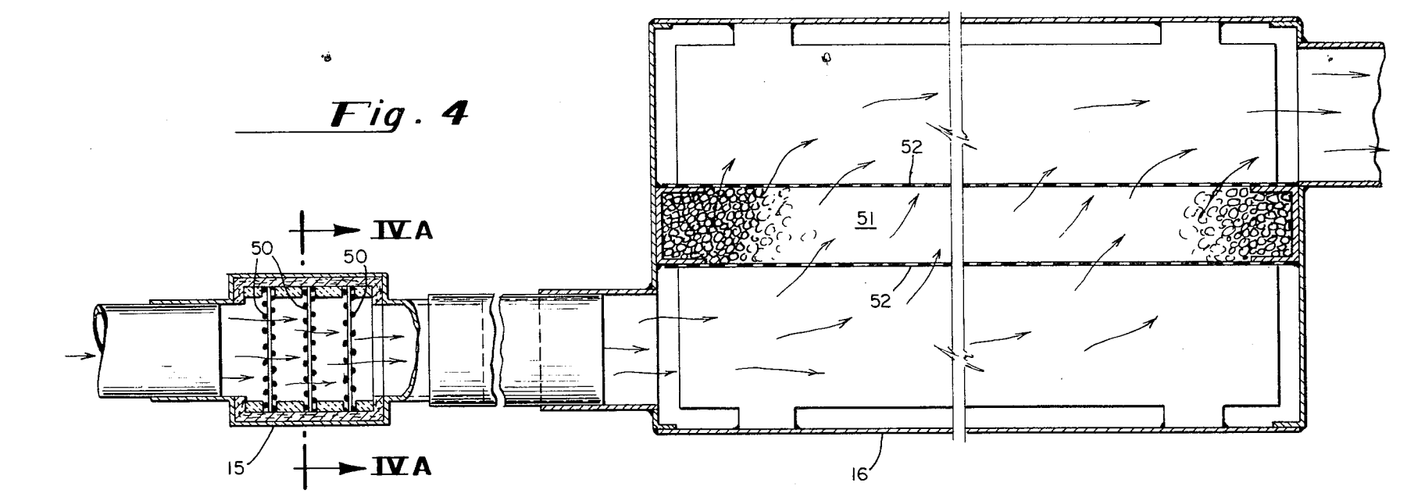
FIG. 4 is an enlarged view in cross-section showing typical details of construction of specific catalytic portions of an apparatus in accordance with this invention.
Figure 4A:
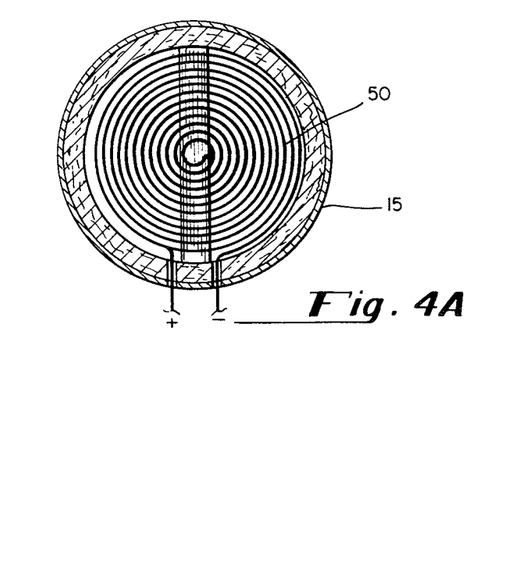
FIG. 4A is a sectional view taken as indicated by the lines and arrows IVA—IVA which appear in FIG. 4.

FIGS. 4 and 4A show an alternate form of apparatus which is useful in accordance with this invention. In FIG. 4, the hot wire chamber 15 contains three hot wire coils 50 which are arranged in series and spaced apart from one another upstream and downstream in the exhaust gas path. The bulk catalyst chamber 16 has a bulk catalyst bed 51 which is supported between a pair of perforated plates 52, 52 providing a catalyst bed of substantial mass and surface area through which the exhaust gases are caused to pass. FIG. 4A shows that the hot wires 50 are arranged in coil form, that each wire has a curved configuration and that it is spaced closely with respect to neighboring turns of the coil.

Figure 8:
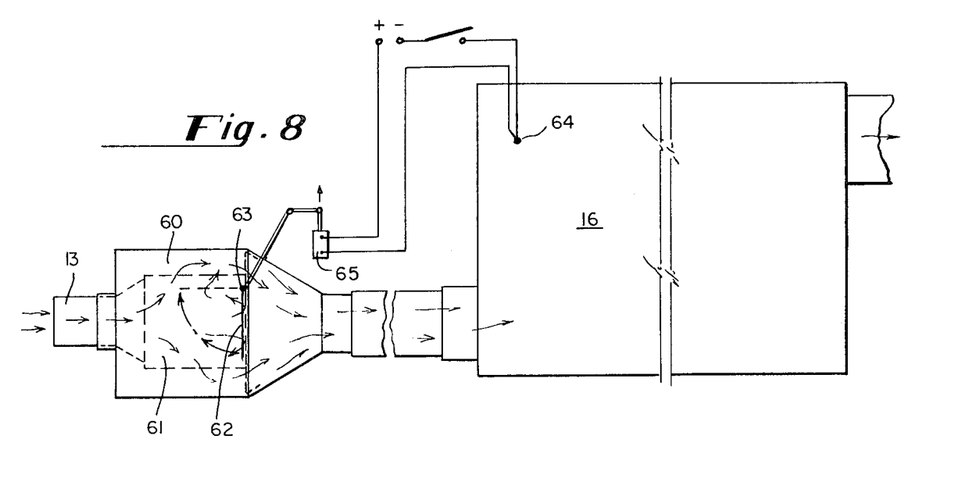
FIG. 8 is a view in side elevation showing schematically another form of apparatus wherein a plurality of hot resistance element catalytic units are arranged in parallel in the exhaust gas stream.
Figure 9:
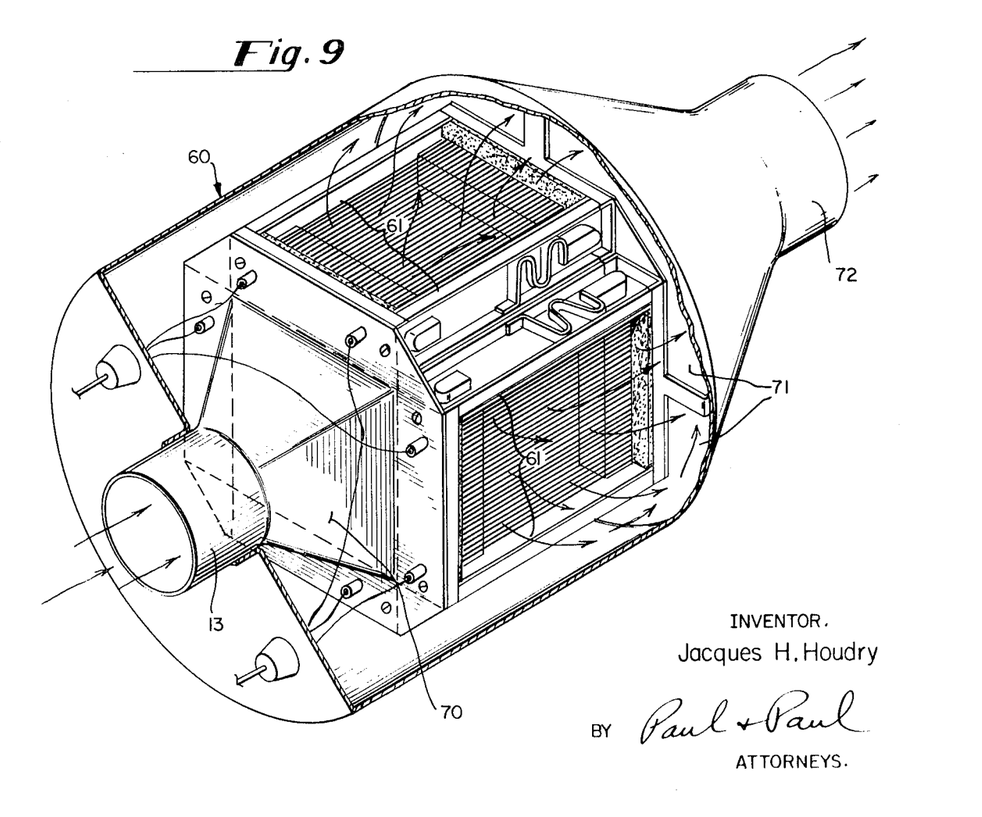
FIG. 9 represents an enlarged view in perspective, with certain portions being cut away in order to reveal important details, showing a parallel arrangement of catalytic wire coils as used in an apparatus such as that of FIG. 8.

FIGS. 8 and 9 show particularly effective arrangements in accordance with this invention, wherein a plurality of units containing catalytic hot wires are arranged in parallel instead of in series. As appears in FIG. 8, the number 60 designates a chamber containing the hot wire catalysts receiving exhaust gases from the exhaust tube 13. In FIG. 8, the number 61 designates one of the catalytic hot wire units, there being four each arranged at right angles to the other forming a centrally arranged passageway of square cross-section, receiving the exhaust gases as they come from the exhaust tube 13. At the downstream end, this area of square cross-section is closed off by means of a wall 62 which is arranged to swing about a pivot 63, for a purpose which will appear in further detail hereinafter. Because the passage of exhaust gases is blocked by the wall 62, the gases flow radially outwardly through the catalytic hot wire units 61 in a direction shown by the arrows in FIG. 8, and flow into and through the bulk catalyst chamber 16 in the manner heretofore described. Means are provided for swinging the wall plate 63 about its pivot, in a manner to open and to close the space which lies within the confines defined by the four hot wire catalyst members 61. Thus, in response to a signal received from the thermocouple 64 embedded in the bulk catalyst bed 16, a solenoid 65 may be selectively energized and de-energized in a manner to open up the wall 62 thus by-passing the effective operation of the hot wire catalyst coils 61, when the catalyst contained in the bulk catalyst chamber 16 has reached a suitable self-sustaining operating temperature. On the other hand, whenever the thermocouple 64 indicates a decrease of temperature within the chamber 16, below a predetermined value, the automatic operation of the solenoid closes the wall 62 thus requiring the exhaust gases to flow radially outwardly through the hot wire catalyst coils 61.

FIG. 9 shows, enlarged and in perspective, some of the specific details of the apparatus referred to in FIG. 8. A squared off conical feed restrictor 70 is arranged to conduct the exhaust gases from the tube 13 into the central area defined by the four hot wire catalyst coils 61, and openings 71 are provided to permit the gases emanating from the hot wire coils to leave the chamber 60 by way of exit 72. Although the specific shape of door 62 is obscured by the wires in FIG. 9, it will be appreciated that its shape corresponds approximately to the shape formed by the ends of the catalyst coils as they are laid together, with just enough clearance to permit the door 62 to swing upwardly within the space defined by such coils 61.

Figure 6:
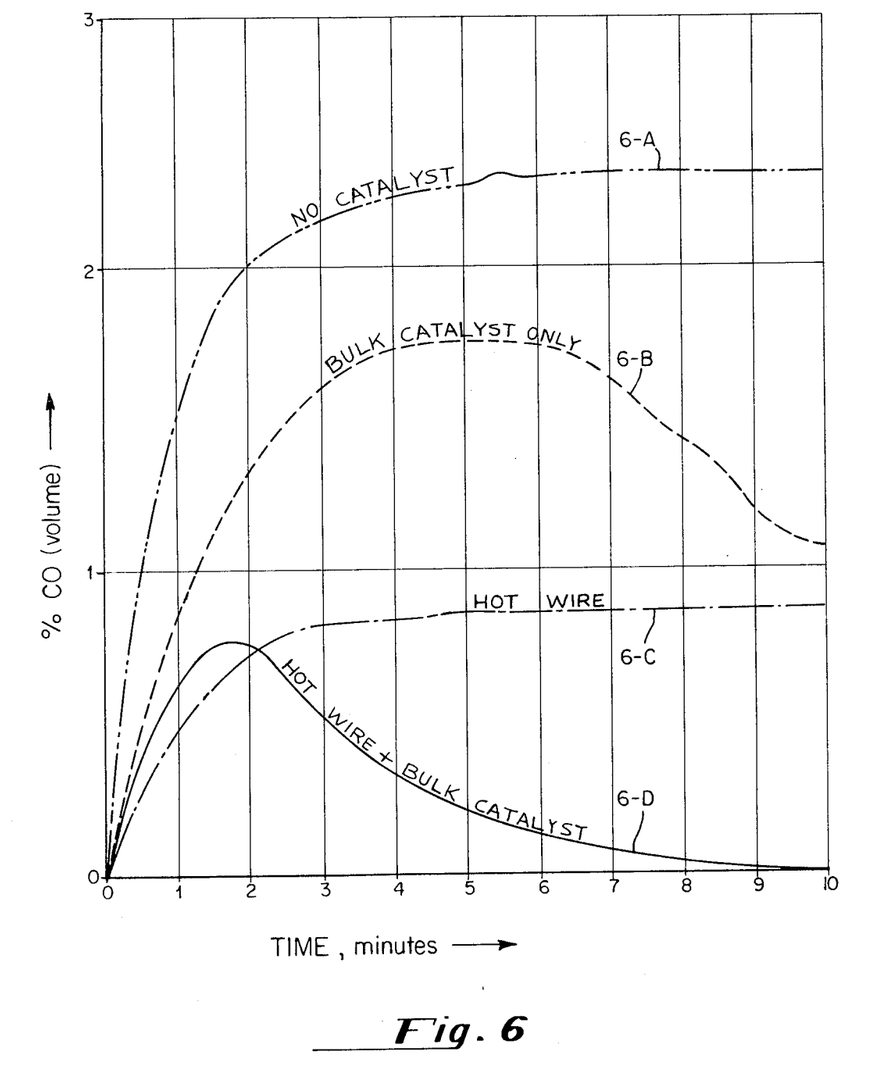
FIG. 6 is a set of curves showing results obtained in four comparative tests illustrating this invention.

FIG. 6 is a chart showing the results of four comparative test runs conducted using a 225 cu. in. "Continental" gasoline truck engine. The four runs were all conducted under the same conditions, all using lead-free gasoline. In each run, the engine was started at an idle speed of 600 r.p.m. and kept there for about 10 seconds, and then increased to 1300 r.p.m. and so maintained for 10 minutes.

The upper curve 6–A shows the volumetric percent CO when no catalyst at all was used; the engine emitted almost 2½% CO while running normally after heating.

Curve 6–B shows that the pellet catalyst bed, which contained 4.25 pounds of ⅛" diameter pellets made of activated alumina impregnated with a copper-chromium catalyst, having a total catalytic surface area of 9260 sq. in., reduced the CO content only very slightly during the early stages of operation, and did not reach an effective operating temperature for at least 6 minutes and was only about 50% effective even after 10 minutes.

Curve 6–C shows the CO content obtained by passing the exhaust gases in series through three coils of the construction shown in U.S. Pat. No. 2,731,541, each three inches square. Each coil had a total wire weight of 13 grams and a total of 18 sq. in. of catalyst surface area coated with gamma $Al_2O_3$ and platinum. Curve 6–C shows the very substantial effectiveness of the coil even during the first two minutes of operation. Each curve shows an early initial rise of percent CO due to the partial combustion of residual hydrocarbons absorbed in the pellet catalyst bed, left over from a previous run through the pellet bed. After two minutes the electric current was disconnected from the coils and they alone maintained the CO content at a level below 1% by volume, far better than obtained in curve 6–B by the pellet catalyst bed which had a total surface area of 9260 sq. in.

Curve 6–D shows the percent CO obtained from the combined operation, in series, of the same three hot wire catalysts and the same pellet catalyst bed. The hot wire catalysts were deenergized after two minutes. The CO content of the exhaust gases was suddenly reduced about ½% after 3 minutes and to essentially zero after 9 minutes.

Figure 7:
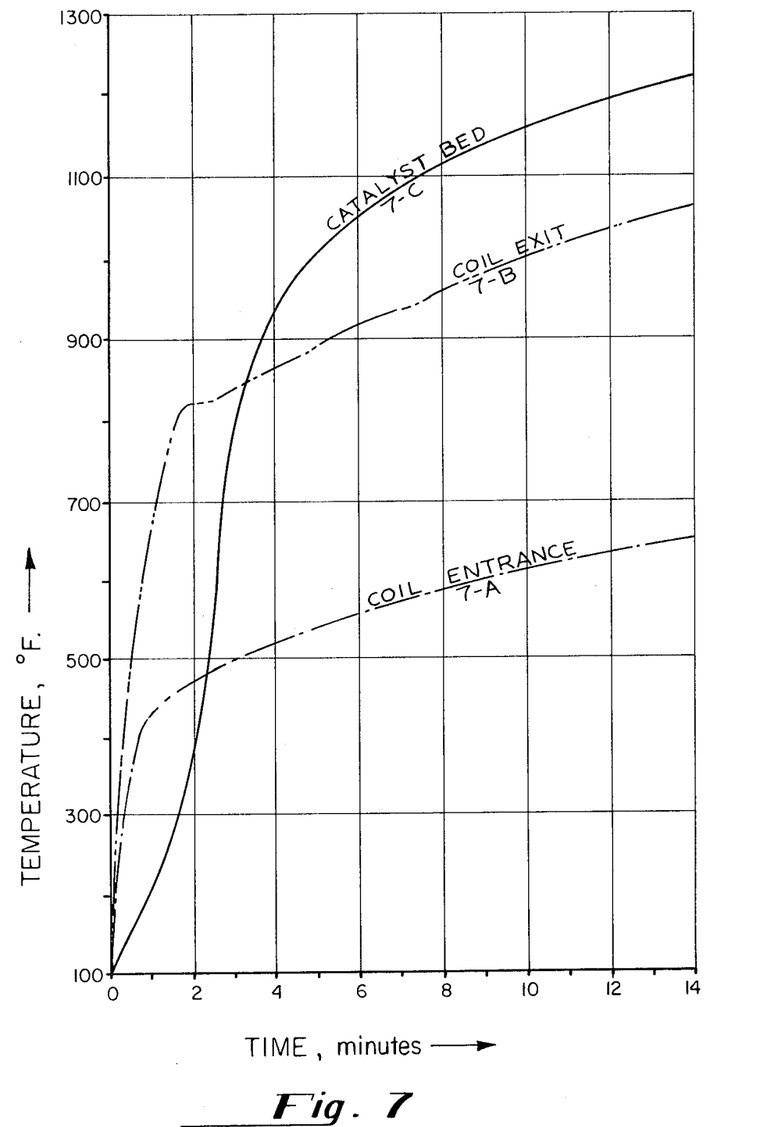
FIG. 7 is a graph similar to FIG. 3, showing the temperature readings obtained in the run which resulted in the CO results appearing in FIG. 6.

FIG. 7 shows the remarkable temperature effects that were obtained in the test that resulted in the gas analyses shown in FIG. 6. Curve 7–A shows the temperature just upstream of the hot wire catalyst coils, curve 7–B shows the temperature just downstream of the hot wire catalyst coils, and curve 7–C shows the temperature of the catalyst pellet bed. The virtually immediate effectiveness of the coils, reflected in a temperature of 500° F. in about 30 seconds, kept the CO percentage below 1% at all times including immediately after start. After about two to three minutes the bulk catalyst reached a self-sustaining operating temperature, and even 14 minutes later the coils were contributing a temperature rise of about 300° F. between coil entrance and coil exit.

Further tests have been run by way of comparison between arrangement of the hot wire coils in series as is shown in FIG. 4 as compared arranging the coils in parallel as shown in FIG. 9 of the drawings. These tests were run using a bed containing four and one-quarter pounds of catalyst pellets having total catalytic surface area of 9260 square inches. These tests also used catalytic hot wire coils of the type illustrated in FIG. 5 of the drawings, each coil measuring two inches square around the inside of the frame, thus providing 8 square inches of effective wire surface area per coil. The effective mass per coil was 6 grams. Thus, the weight ratio between the catalyst pellets and the coils was 80:1 and the area ratio was 290:1. In each case, measurements were made of the percentage of combustibles contained in the exhaust gas as it came from the engine at a location upstream of the coils, also at a location downstream of the coils thus obtaining a measure of the effectiveness of the coils, and also at a location downstream of the catalyst pellet bed. With four such coils arranged in series, it was found that the coil contributed 25% of the total clean-up, whereas the four coils arranged in parallel contributed 48% of the total clean-up.

Tests were also conducted to determine the relative effectiveness of less than four coils. It was found that when four coils were used in parallel, the volumetric flow of exhaust gas was five standard cubic feet per minute per coil, and at this flow rate the four coils produced 48% of the total clean-up, the velocity through each coil being 36 feet per second. When one coil was blanked off, thus presenting three coils in parallel, the velocity was 48 feet per second through each coil and these three coils contributed 39% of the total clean-up, the volumetric flow being 6⅔ standard cubic feet per minute per coil. When yet another coil was blanked off, leaving two coils arranged in parallel, ten standard cubic feet per minute of air passed through each coil, at a velocity of 72 feet per second, and the two coils cleaned up 32% of the total clean-up, the balance of course being provided by the pellet catalyst bed, it being understood that in all of these tests the catalyst bed had been previously brought up to its self-sustaining effective catalytic operating temperature.

The foregoing test shows that substantial improvements and effectiveness of the hot wire catalysts are obtained by so arranging the catalysts that the volumetric and linear rate of flow of exhaust gases through the spaces between the wires is as low as possible.

Catalytic hot wire structures of various types are suitable for the practice of this invention. Preferably, the wire should be arranged such that a large number of wire segments or lengths are laid out in a plane, closely spaced apart and substantially parallel to one another. The lengths of wire may be straight and contained in a generally rectangular frame as shown in Oxy-Catalyst U.S. Pats. Nos. 2,801,906, 2,853,368, 2,850,366 and 2,850,365, for example, or wire may be arcuately coiled in a single plane to fit into a cylindrical chamber as shown in Oxy-Catalyst Pat. Nos. 2,715,671 and 2,731,541, for example, or any other suitable arrangement may be used. It is feasible to use a single coil structure or to use a multiplicity of such coil structures arranged in series or even in parallel. For example, one particularly useful apparatus employs six such coils arranged in series in the gas stream, each one composed of resistance wire coated with an active catalyst and each being connected to the electric current in the manner described above. An even more effective apparatus employs the same six coils arranged in parallel.

The hot wire is specially treated to provide strongly catalytic oxidative surface properties which immediately take effect when the wire is heated. This may be accomplished in a variety of ways, but one preferable procedure providing excellent adherence of the catalytic film to othe wire is shown and described in the U.S. patent to Houdry No. 2,965,583, granted Dec. 20, 1960. The metal wire, which may be composed of Nichrome, steel, nickel or various alloys of these or any other metal wire having the necessary strength and physical properties, is provided with a thin film composed of a mixture of alumina and another oxide of either beryllium or zirconium or both, in a mol ratio of from 1:10 to 10:1. Preferably this is accomplished by heating to decompose a salt of the metal, as disclosed in the Malina Pat. No. 2,580,806. The film is impregnated with a finely divided catalytically active precious (noble) metal such as platinum, ruthenium, palladium or iridium, or a catalytically active base metal such as silver, chromium, copper, nickel, cobalt and mixtures thereof, preferably by dipping into an aqueous solution of the metal salt, following by heating or otherwise reducing the salt to the metal in situ.

The bulk catalyst chamber may be of a wide variety of shapes, sizes and designs depending upon the particular service for which it is intended. The chamber may be arranged to direct the exhaust gas stream through a bulk catalyst in the form of pellets, as shown in FIG. 4 and illustrated in the U.S. patent to Houdry No. 2,776,875, for example. The pellets may be made conveniently by use of the procedures detailed in the U.S. patent to Houdry No. 2,921,033, granted Jan. 12, 1960 and in the U.S. patent to Calvert No. 3,177,151, granted Apr. 6, 1965 to Oxy-Catalyst, Inc.

Alternatively, the chamber may be composed of a plurality of porcelain rods as disclosed in the U.S. patents to Houdry Nos. 2,699,989 and 2,921,035, or may be arranged to carry one or a plurality of perforated or honeycomb structures of the type shown and described in the U.S. patent to Houdry No. 2,742,437, for example. Other specific forms of catalyst chamber and catalyst structure may be substituted, if desired, for any specific usage or installation.

The bulk catalyst contained in the chamber 16 may be manufactured in a variety of known ways. One of the early ways appears in the U.S. patent to Malina No. 2,580,806, wherein an active metal oxide (of aluminum, magnesium, beryllium or thorium or mixtures thereof) is uniformly dispersed as a slurry in a liquid solution of salts of the foregoing metals or acids, and the slurry is applied to a catalytically inert support and the product dried at a temperature to decompose the salts and leave a film of active metal oxide on the support. One preferred oxide is activated alumina, or gamma alumina, which has an exceedingly high pore volume and which has a tremendous surface area differing sharply from that of the trigonal crystal oxide alpha alumina, which is relatively inactive catalytically.

On the other hand, the porous oxide coating on the bulk catalyst may also be impregnated with a catalytically active metal, as disclosed in the patent to Houdry No. 2,742,437. The impregnation, as disclosed, may be accomplished by any of the methods known in the art, as, for example, by dipping the support with its adherent film of metal oxide, into a solution of a salt of the appropriate metal and decomposing the salt by heat. Suitable metals include platinum, ruthenium, platinum and manganese, palladium, silver, chromium, silver and chromium, iridium, copper, copper-chromum, copper-maganese, nickel, cobalt and a wide variety of other metals and other metal combinations.

Operating experience with the combination in accordance with this invention has revealed surprising and unexpected effectiveness when one considers the surface area of the hot wire catalyst. For example, using hot wire coils wherein each coil represented approximately 6 square inches of catalyst surface area, the use of six coils in series resulted in the total exposure of 36 square inches of catalyst surface. In a concrete test, the combustibles entering the hot wire coil catalyst chamber amounted to approximately 4% of the total exhaust gas volume. The outlet showed approximately one-half of 1% combustibles, indicating approximately a 90% reduction of combustibles. However, without the use of the coils, and with the use of hot bulk catalyst in the form of pellets, in order to remove the same 90% of the combustible the same internal combustion engine (225 cubic inches) required 4.25 pounds of ⅛ inch activated pellets having a total surface area of approximately 9260 square inches, or 257 times the surface area of the coils used. Thus, it has been demonstrated that a wire of a small diameter (.016 inch) coated with a catalyst appears to have a much greater activity per unit per surface area than other better known catalysts, such as activated aluminum pellets and monolithic supports such as ceramic honeycomb treated with catalyst. This makes possible the use of more active and expensive catalytic materials such as the precious or noble metals platinum, rhodium and palladium, for example, when otherwise their use would be prohibitively expensive. Because the catalytically coated resistance wire needs to have only a fraction of the catalytic surface area normally required with standard catalytic materials, only a nominal amount of expensive or rare metal is required. It is of particular interest that, in typical cases, the bulk catalyst may contain as much as 500 times the weight of platinum as the hot wire. When the bulk catalyst used a base metal and the hot wire used a precious metal, the base metal may be present in an amount of 10 to as much as 500,000 times the amount of precious metal in the hot wire catalyst.

It is of particular advantage that means are provided for automatically disconnecting the hot wire catalyst when the bulk catalyst has reached its operating temperature. Whether or not the hot wire continues to function as a catalyst after it has been de-energized, the de-energization lowers the temperature of the wire. This is useful particularly when an oxide such as active aluminum oxide is used on the surface of the wire. Gamma alumina, the active form of aluminum oxide, tends to degrade by heat into a much less active crystalline form, alpha alumina. Thus, the longer the gamma alumina is maintained at a very high temperature by the presence of the electric current flowing through the wire, such degradation is taking place. The effect of such degradation is accumulative. Since even a precious metal such as platinum is quite inactive catalytically if it is impregnated into an alpha alumina surface, it is important to maintain on the surface of the wire a substantial percentage of gamma alumina, which has millions of tiny pores measured in the Angstrom range; so long as the pores are open a tremendous surface area is available and its catalytic effect is quite substantial. Thus, the disconnection of the power source at an appropriate time materially inhibits the degradation of gamma alumina to alpha alumina and greatly prolongs the effective life of the hot wire.

With respect to the surprising effectiveness of the hot wire catalyst when a plurality of wires are arranged closely spaced in parallel arrangement to one another, it is believed that the presence of void spaces between the wires, through which the exhaust gases flow, greatly increases the efficiency of the catalytic surfaces and thus produces catalytic reactions which are approximately one hundred times faster than those produced by comparable areas of the same catalyst impregnated into pellets or other bulk catalysts.

A further advantage in connection with the hot wire is that platinum, for example, is not a tremendously active catalyst for the oxidation of exhaust gases from internal combustion engines at 450° F., but is perhaps ten times as active at a temperature of 600° F. Thus, the existence of the electric current, which can easily raise the wire temperature to 600° F. or above, provides a drastic increase in catalytic efficiency of the platinum that is impregnated in the oxide on the surface of the wire. Similar effects have been observed in connection with other catalytic metals on wires that have been heated to temperatures on the order of 600° F. and above.

In accordance with this invention it is important that the hot wire, whether as a coil or in any other form, performs three functions: it adds sensible heat to the exhaust gases, it adds the heat of catalytic reaction, and it catalytically oxidizes the unburned hydrocarbons and carbon monoxide in the exhaust gases while the bulk catalyst is too cold to perform its catalytic oxidizing function.

In accordance with this invention the bulk catalyst mass and area must be considerably larger than the total mass and surface area of the hot wires that are used as a hot wire catalyst. For example, the ratio between these two masses and areas may be of the order of 25 to 5000 times.

It is, of course, within the scope of this invention that either the bulk catalyst or the hot wire catalyst, or both, may be either a noble metal or a non-noble metal or mixtures thereof. Any number of different metals may be applied either to the wire or to the pellets or monolithic structures in the bulk catalyst, all as is fully elaborated upon in the prior art.

Although reference has been made herein to the use of a thermocouple in a pellet bed, which is arranged to disconnect the hot wire catalyst when the pellet bed has reached its operating temperature, it will be appreciated that it is preferable also to provide a supplemental protective thermocouple on the hot wire catalyst itself, in order to cut off the electric current to protect the hot wire catalyst from degradation due to overheating.

It will be appreciated, also, that various other means may be used, if desired, to reduce or to stop the flow of current in the hot wire catalyst at an appropriate time. For example, this may be done alternatively by a timing device which measures the time that the internal combustion engine has been running, and which decreases or stops electric flow through the hot wire catalyst after a sufficient running time has elapsed in order to heat the bulk catalyst in the chamber 16 to the desired temperature. As another alternative, a pressure sensing procedure may be utilized, since the pressure in the exhaust pipe reflects the combined temperature and volumetric gas flow; a pressure sensing device is connected to cut off the electric supply from the hot wire catalyst. As another alternative, the engine speed itself, or the speed of revolution of the drive shaft or some other part of the vehicle may be used as an indicator of the general magnitude of the engine speed and this in combination with a pressure sensing device may be used to cut off the supply of electricity to the hot wire catalyst. Obviously, any one of these methods may be used in conjunction or in combination with any or all of the others. In some cases, of course, it may be deemed preferable simply to dispense with any such protective device and simply operate the hot wire catalyst with a steady flow of electricity.

Catalyst pellet beds normally tend to absorb hydrocarbons from the exhaust gas stream when the engine is shut down and the catalyst bed is permitted to cool. Then, when the engine is started again and the catalyst bed is reheated, it emits the absorbed hydrocarbons before it is hot enough to cause them to be oxidized catalytically. This shows another advantage of this invention, because the hot wire catalyst, even when de-energized, sharply reduces the hydrocarbon content before the gases reach the pellet catalyst bed, and thus sharply reduces the amount that can be absorbed by the catalyst bed and emitted upon reheating.

It is of particular advantage that the hot wire catalyst in accordance with this invention may be mounted at any convenient location along the exhaust gas path, and does not need to impose upon the already cramped space in the engine compartment of the vehicle. Indeed, it does not need to be at any location near the engine at all, and can be conveniently located near the rear of the vehicle, upstream or downstream of the muffler and, if desired, immediately upstream of the pellet catalyst bed 16. This is attributable to the fact that the very surface of the hot wire is itself catalytic, and that it is almost instantly responsive to the flow of electricity through the wire to heat the catalytically effective surface to a temperature well above its minimum temperature of catalytic effectiveness. Thus, even when an engine is started cold after having been exposed to very cold weather for an extended period of time, the immediate flow of current from the battery or from the alternator of the engine brings the surface of the metal wire to an effective operating temperature almost instantaneously, even when the hot wire catalyst is located near the exit end of the tail pipe of the vehicle. There is no necessity to provide heat to the catalyst by convection of air or other gases, because the heat is internally generated within the catalyst by the flow of electricity itself. In devices of the prior art, which rely upon convection heating of a ceramic or sintered body having a substantial mass, such convection heating, coupled with the relatively large mass of the catalytic body, cause very substantial time delay as compared to the substantially instantaneous heating of the hot wire catalyst according to this invention.

The electrical characteristics of the catalytic resistance element may vary in a variety of particulars, provided however that the element is virtually immediately responsive to the available voltage and current to heat substantially instantly and, in any event, to heat within about 15 to 30 seconds to a catalytic operating temperature. For standard automotive use, the normal voltage is 6–14 and a current of 10–80 amperes is available from the battery, alternator or generator. Under many conditions, a catalytic hot wire having a resistance of about 1/10 to 2 ohms produces excellent results. For other power sources, different catalytic hot resistance elements may be provided with resistance characteristics adjusted up or down accordingly to provide rapid heating combined with long life, as is well known.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and parts may be reversed, all without departing from the spirit or scope of the invention as defined in the appended claims.

The following is claimed:

1. In apparatus which is quickly effective upon starting an internal combustion engine for oxidizing unburned exhaust gas ingredients, the combination which comprises an internal combustion engine having an exhaust conduit through which said exhaust gases are caused to flow as a stream, electrically conductive resistance means having a catalytic surface having a predetermined mass arranged in said conduit, with said resistance means having electric heating means for increasing the temperature of the stream for oxidizing unburned ingredients exothermically, and said resistance means having portions that are closely spaced with respect to each other and with respect to said conduit and extending across substantially the entire stream with void spaces therebetween to comprise means for allowing a high degree of contact between said resistance means and exhaust gases passing therethrough and for catalytically sufficiently heating exhaust gases passing therethrough for drastically increasing the temperature of the stream for oxidizing unburned ingredients catalytically, and a bulk catalyst located in said stream, downstream of said resistance means catalyst and in a position to receive sufficient heat that is generated by said hot resistance means catalyst, the mass of said bulk catalyst being many times the mass of said resistance means.

2. The apparatus defined in claim 1, wherein said heating means comprises a source of electric power connected to cause electricity to flow through said resistance means catalyst.

3. The apparatus defined in claim 2, wherein said resistance means is a wire and a sensing means is connected to sense the catalytic operativeness of said bulk catalyst and is connected to said source of electric power by means for deenergizing said hot wire catalyst electrically when said bulk catalyst is at a catalytically effective operating temperature.

4. The apparatus defined in claim 1, wherein said resistance means catalyst comprises a plurality of lengths of wire spaced apart from one another in a side-by-side configuration to provide intervening spaces, said hot wire catalyst exposing said intervening spaces to penetration by said stream.

5. The apparatus defined in claim 4, wherein said lengths of wire are arranged substantially straight.

6. The apparatus defined in claim 4, wherein said lengths of wire are curved.

7. The apparatus defined in claim 6, wherein said lengths of wire are arranged as a continuous repeating curve of gradually increasing diameter forming a generally circular coil.

8. The apparatus defined in claim 1, wherein said resistance means comprises a plurality of separate hot resistive units arranged in said exhaust gas stream.

9. The apparatus defined in claim 8, wherein said units are arranged in parallel with respect to the flow of said exhaust gases.

10. The apparatus defined in claim 8, wherein said units are arranged in series with respect to the flow of said exhaust gases.

11. The apparatus defined in claim 1, wherein said resistance catalyst has a surface coating comprising a highly porous oxide of a metal selected from the group consisting of aluminum, magnesium, beryllium, thorium and zirconium and mixtures thereof.

12. The apparatus defined in claim 11 wherein said surface coating includes a finely divided metal selected from the group consisting of platinum, ruthenium, palladium, iridium, silver, chromium, copper, nickel, cobalt and mixtures thereof.

13. The apparatus defined in claim 1, wherein said bulk catalyst comprises a highly porous oxide of a metal selected from the group consisting of aluminum, magnesium, beryllium, thorium, zirconium and mixtures thereof.

14. The apparatus defined in claim 13, wherein said bulk catalyst has a surface coating that includes a finely divided metal selected from the group consisting of platinum, ruthenium, palladium, iridium, silver, chromium, copper, nickel, cobalt and mixtures thereof.

15. The apparatus defined in claim 1, wherein said bulk catalyst has a catalytically effective surface area that is at least 50 times said predetermined catalytically effective surface area of said resistance means catalyst.

16. The apparatus defined in claim 1, wherein said bulk catalyst has a mass that is at least ten times the mass of said resistance means catalyst.

17. The apparatus defined in claim 1, wherein said resistance means is a hot wire having precious metal electrolytically deposited thereon.

18. The apparatus defined in claim 1, wherein said resistance means includes a precious metal and said bulk catalyst is substantially free of precious metal.

19. The apparatus defined in claim 18, wherein the bulk catalyst includes a base metal catalyst which is present in an amount of 10–500,000 times the amount of precious metal on said resistance means.

20. The apparatus defined in claim 1, wherein said electrically conductive resistance means comprises a plurality of units arranged in parallel with one another and forming a closed loop having an inlet and a by-pass outlet for the exhaust gases, and wherein blocking means are disposed for adjustment to open and close said outlet.

21. The apparatus defined in claim 1, wherein the electrically conductive resistance means comprises an element that has a resistance of about $\frac{1}{10}$ to 2 ohms.

22. In an apparatus which is quickly effective upon starting an internal combustion engine for oxidizing unburned exhaust gas ingredients, the combination which comprises an internal combustion engine having an exhaust conduit through which said exhaust gases are caused to flow as a stream, an electrically conductive resistance element having a catalytic surface having a predetermined mass arranged in said stream, electric means for heating said resistance element to oxidize unburned ingredients catalytically and exothermally, and a bulk catalyst located in said stream, downstream of said resistance element catalyst and in a position to receive heat that is catalytically generated by said hot resistance element catalyst, the mass of said bulk catalyst being many times the mass of said resistance element, wherein said electrically conductive resistance element comprises a plurality of units arranged in parallel with one another and forming a closed loop having an inlet and a by-pass outlet for the exhaust gases, and wherein blocking means are disposed for adjustment to open and close said outlet, wherein sensing means are provided for sensing increases and decreases of the operating temperature of the bulk catalyst, and wherein actuating means are connected from said sensing means to said blocking means to control the position of said blocking means in response to said sensing means.

References Cited

UNITED STATES PATENTS

| | | | |
|---|---|---|---|
| 3,503,716 | 3/1970 | Berger | 23—288 F |
| 2,038,567 | 4/1936 | Ittner | 23—288 F UX |
| 3,276,202 | 10/1966 | Gary | 23—288 F UX |
| 2,396,190 | 3/1946 | Morgan et al. | 23—288 F X |
| 3,043,096 | 7/1962 | McLoughlin | 23—288 F UX |
| 3,142,150 | 7/1964 | Pearlman | 23—288 F UX |

JOSEPH SCOVRONEK, Primary Examiner

U.S. Cl. X.R.

23—288 J; 60—300